United States Patent [19]

Bach et al.

[11] Patent Number: 4,602,574

[45] Date of Patent: Jul. 29, 1986

[54] DESTRUCTION OF TOXIC ORGANIC CHEMICALS

[75] Inventors: Robert D. Bach, Wayne County, Mich.; Christopher J. Nagel, Cook County, Ill.

[73] Assignee: United States Steel Corporation, Pittsburgh, Pa.

[21] Appl. No.: 669,420

[22] Filed: Nov. 8, 1984

[51] Int. Cl.$^4$ .................................................. F23G 7/00
[52] U.S. Cl. .......................................... 110/346; 75/45; 110/237; 110/238; 110/250; 201/11; 202/219; 422/186.21; 423/437; 423/481
[58] Field of Search ............... 110/235, 237, 238, 250, 110/243, 346; 75/48; 423/481, 659, 437; 422/186.21; 201/11; 202/219; 266/220, 222, 223; 60/39.04, 39.12; 48/197 R, 206

[56] References Cited

U.S. PATENT DOCUMENTS

| | | | |
|---|---|---|---|
| 2,647,045 | 7/1953 | Rummel | 48/206 |
| 3,845,190 | 10/1974 | Yosim et al. | 423/437 X |
| 3,890,908 | 6/1975 | von Kleck et al. | 110/243 |
| 4,140,066 | 2/1979 | Rathien et al. | 110/235 |
| 4,230,053 | 10/1980 | Deerdorff et al. | 110/237 X |
| 4,246,255 | 1/1981 | Grantham | 423/481 X |
| 4,400,936 | 8/1983 | Evans | 110/238 X |
| 4,402,274 | 9/1983 | Meenan et al. | 110/346 |
| 4,431,612 | 2/1984 | Bell et al. | 422/186.21 |
| 4,432,344 | 2/1984 | Bennington et al. | 110/235 X |
| 4,481,891 | 11/1984 | Takeshita et al. | 110/346 X |

Primary Examiner—Albert J. Makay
Assistant Examiner—Steven E. Warner
Attorney, Agent, or Firm—William L. Krayer

[57] ABSTRACT

Toxic chemicals such as polychlorinated biphenyls and other organic wastes are destroyed by injecting them, together with oxygen, into a metal or slag bath such as is utilized in a steelmaking facility. The metal bath may be melted initially by induction or an electric arc; the desired temperature greater than 2500° F. may be maintained thereafter by the reaction of the oxygen and the organic waste. Various by-products may be obtained from the gas.

19 Claims, 2 Drawing Figures

DESTRUCTION OF TOXIC ORGANIC CHEMICALS

BACKGROUND OF THE INVENTION

During the past thirty years over 1.4 billion pounds of polychlorinated biphenyls (PCBs) have been produced in the United States alone. Increasing public awareness and concerns of PCB contamination and toxicity to animals and man have prompted the Environmental Protection Agency (EPA) to regulate its disposal and to require the phasing out of its use. How to dispose of PCBs is only one of a number of toxic waste problems to be faced in the very near future. Current EPA estimates, based on 1981 figures, indicate an annual hazardous waste generation of seventy-one billion gallons. Hazardous wastes include such unattractive materials as pesticides, herbicides, hospital wastes including pathogens, paints, inks and contaminated solvents, black liquor, and explosives. These wastes will all require destruction at some point in their use cycle.

The following reactor types have been offered or used commercially as solutions to hazardous waste disposal: rotary kiln, liquid injection, multiple hearth, multiple chamber, fluidized bed, molten salt, and high efficiency boilers. Though each of these reactors has some desirable practical and theoretical operating features, none can claim profitable operation. Of the above reactors, the rotary kiln is most commonly employed in the United States and Europe. Although such reactors can achieve a combustion efficiency of greater than 99.99 percent, post-combustion and high residence times are typically required. Incineration of this type involves a combination of pyrolysis (1200° C. and combustion that is initiated by a high temperature flame. Although the initial pyrolysis transforms the organic compound into a more oxidizable form, the oxidation process requires the actual collision of the resulting incipient high energy fragments with oxygen. In a rotary kiln, where the reaction medium may tend to be highly viscous, it is often difficult to bring the reacting species into direct contact with oxygen. This lack of efficient mixing on a molecular level impedes the rate of destruction. Rotary kilns are therefore typically inefficient, requiring excess oxygen and, hence, more auxiliary fuel. The actual exothermic (heat liberating) reaction, attending the reaction with oxygen, occurs away from the flame tip as the reacting materials are fed through the reaction chamber. Consequently, the heat generated by these reactions cannot be utilized efficiently for the initial endothermic pyrolysis step.

A high-turbulence combustion chamber having a pulsating spiral flow will lower the residence time and temperature required for destruction, according to Rathjen et al in U.S. Pat. No. 4,140,066.

We are also aware of the work of certain others in the field of coal gasification which may be relevant to a consideration of prior art processes. In Rummel's U.S. Pat. No. 2,647,045, for example, a molten slag bath obtained from the reduction of iron ore or from the "non-combustible residues of coal products" is circulated and finally divided coal is injected into the bath and a separate addition of air is also conducted along with "an endothermic gaseous reactant", i.e. water. The process is preferably conducted in two separate endothermic a exothermic zones. Thus, the elementary idea of using the latent heat of molten slag to combust coal is known. Rummel made certain improvements and variations of his basic approach, as disclosed in U.S. Pat. Nos. 2,848,473; 2,923,260, and 3,953,445, none of which enhance the relevance of the basic idea to the present disclosure. An iron bath is used for coal gasification in U.S. Pat. No. 4,388,084. In U.S. Pat. No. 4,389,246 to Okamura et al, on the subject of coal gasification employing a molten iron bath, the bottom-blowing of ethane is described (see particularly column 6, lines 7–14); the ethane or other hydrocarbon gas is used to stir the mixture and for this reason is considered by Okamura et al to be equivalent to oxidizing gases and inert gases as well as oxidizable gases.

Injection from above is also employed in Gernhardt et al U.S. Pat. No. 4,043,766, Okamura et al U.S. Pat. No. 4,389,246, Okane et al U.S. Pat. No. 4,388,084, and Bell et al U.S. Pat. No. 4,431,612.

Titus et al, in U.S. Pat. No. 3,812,620, envision a molten pool of glass and miscellaneous metals obtained during the incineration of "heterogeneous waste materials" such as municipal garbage; the various organics are "decomposed" in the pool at temperatures of the order of 1600° F. and "further pyrolyzed" ("at least some gases") at 2000° F. While the inventors (in column 5) mention the possibility of temperatures of up to "10,000° F. or more" in order to ensure that iron remains in a molten state, they do not add oxygen in the bath and appear to utilize the bath only for the thermal decomposition of miscellaneous organics. See also von Klenck et al U.S. Pat. No. 3890,908. Yosim et al, in U.S. Pat. No. 3,845,190, also envision pyrolytic destruction in a bath followed by oxidation in a zone above it.

The molten salt process involving the reaction of material with a hot alkali metal is typified by the disclosure of Grantham's U.S. Pat. No. 4,246,255 maintaining a bath of, for example, alkali metal carbonates, at about 700–1000° C. Oxygen is also injected into the molten salt. Southwick, in U.S. Pat. No. 3,527,178, employs a metal bath.

Molten iron is employed by Rasor in U.S. Pat. Nos. 4,187,672 and 4,244,180 as a solvent for carbon generated through the topside introduction of coal; the carbon is then partially oxidized by iron oxide during a long residence time and partially through the introduction of oxygen from above. The Rasor disclosure maintains distinct carbonization and oxidation chambers.

We are also aware of the relatively large-scale destruction of PCBs in large utility boilers through their addition to the conventional fuel in amounts up to 5%. See "Destruction of High Concentration PCBs in a Utility Boiler" by Siedhoff, Zale & Morris, proceedings of the 1983 PCB Seminar, Electric Power Research Institute. While this appears to be an expedient disposal method, and the destruction of PCBs reaches the EPA requirement of over 99.99 percent, the long-term corrosion and other effects on the high-efficiency boiler are largely unknown; likewise the oxidation cannot be as efficient as that in our own process, and in fact the handling costs for the PCBs tend to equal or exceed the fuel value.

Profitable decomposition of hazardous waste must rely heavily on efficient, cost-effective recovery of energy and high-pury by-products. Generally, the economic recovery of high grade energy will be maximized when destruction occurs efficiently without auxiliary fuel addition.

SUMMARY OF THE INVENTION

Our invention enables the complete destruction of all hazardous non-radioactive organic (and inorganic) compounds. This process, which may utilize steelmaking technology and equipment such as that disclosed in Knuppel et al U.S. Pat. No. 3,706,549, comprises injection of oxygen and organic waste above the surface of a molten metal bath, via lance-type injection, or below the surface, by bottom tuyere or port injection, such that interaction can occur with the bath, which is of at least 10% iron, the balance comprising various other metals, slags, oxides, carbonates, silicon and the like, in the absence an external source of flame. The molten metal fraction, which is maintained at temperatures greater than 2500° F., serves to provide a catalytic surface for the initial pyrolitic bond-breaking step and for the activation of molecular oxygen. This catalytic surface lowers the total energy necessary for complete decomposition and minimizes auxiliary fuel requirements. At these temperatures, the molecules are rapidly but endothermically fractured into highly oxidizable fragments or to their atomic states. This efficient atomization or molecular dispersion, when combined with activated oxygen on a metal surface, greatly facilitates the exothermic oxidation of molecular fragments and atomic carbon. The relatively low viscosity molten metal "solvent" assures efficient bi-molecular collision of the reacting species and provides a stationary phase to absorb the heat of reaction. Exothermic reactions, which occur naturally in a decomposition/oxidation process, are capable of maintaining a desirable heat balance, provided the heat is transferred efficiently and sufficient mixing, atomization and molecular dispersion occur to maintain a favorable overall reaction rate. A dynamic carbon balance is maintained at about $\frac{1}{2}\%$ carbon to about 6% carbon, preferably about 2% to about 3%, across the molten iron bath by controlled continuous carbonaceous waste injection. This effective carbon balance prevents rapid refractory degradation and facilitates reaction kinetics by providing a high carbon concentration gradient. Primary decarbonization occurs by oxidation within the melt where carbon, after being reduced to its atomic state, is easily absorbed. Secondary decarbonization occurs in the gas phase and at the gas/liquid interface in the slag layer. The facile formation of carbon monoxide from toxic wastes also affords the possibility of performing $C_1$ chemistry when that is deemed practical. The high carbon, low ferrous oxide slag, maintained above the iron melt, provides a surface for exothermic radical recombination (e.g., $H. + Cl. \rightarrow HCl$) and a medium for sulfur or heavy metal scavenging. Gaseous elements, such as hydrogen and chlorine, which are stripped from the parent compound upon injection, combine within the melt when electronic affinities are sufficient; however, where the energy of the bath overcomes these forces, formation of products such as hydrogen chloride will occur above the melt.

The single most advantageous feature of this process, when compared to existing technology, is its thermal efficiency in the oxidation step. We attribute this to the catalytic activity of the molten metal surface and the efficient collision of reactants and transfer of heat in the same bath from the reactants to (and into) the reaction medium. These singular properties may be directly translated to an economic advantage over competing methods. In addition, by maintaining comparatively higher operating temperatures and near stoichiometric oxygen addition, thermal recovery may be enhanced and the concentrated chemically pure gaseous by-products that are uncontaminated with their progenitors may be recovered.

It is preferred that the reactor (furnace) be of more or less conventional design and technology. It should permit a controlled residence time distribution to ensure complete destruction and should have no moving parts in the reaction zone to afford low maintenance. The process is preferably continuous. It should utilize iron as the significant portion of the solvent to ensure maximum heat transfer. Iron also provides an excellent catalytic surface and may advantageously comprise 90% or more of the molten bath composition. An insulating medium should be employed above the bath to minimize heat loss and support exothermic radical recombination (thereby maximizing heat generation within the bath).

Several types of existing reactors, or furnaces, may be used advantageously, although various modifications may be made, and other designs will suffice, as will become apparent in the detailed discussion of our process. The "A.O.D.", or "argon-oxygen-decarbonization" furnace is readily adaptable to our process, for example. A relatively small (ten ton) induction-type furnace may, for example, be readily adapted to practical use. A much larger unit resembing a bottom-blown basic oxygen steelmaking vessel optionally fitted with a top lance could be employed for very large scale central processing; a hot metal supply must be available. We have illustrated two (2) related basic exemplary vessels.

FIG. 1 is a more or less diagrammatic illustration of a top and bottom-blown vessel where the iron charge is initially heated by induction external to the bath.

FIG. 2 is a more or less diagrammatic illustration of an electric arc furnace containing a molten pool of iron and fitted with bottom tuyere injection capabilities.

DESCRIPTION OF THE DRAWINGS

Referring now to the drawings, the more or less diagrammatic depiction of a vessel suitable for the process of our invention as seen in FIG. 1 is an induction furnace comprising container walls 1 having built therein induction heat coils at 2 and having trunions 3 for ease of handling. The design also includes an off-take 4 for hot gases and means 5 for injecting an organic waste such as a polychlorinated biphenyl or pesticide into the bottom of the vessel, preferably concentrically through the same inlet means as oxygen.

At the top may also be intake means 6 for steam and additional oxygen if they are desired and an additional intake means 7 for other waste materials. A further inlet 10 may be provided for flux or for the additional input of waste materials. Seals 8 should be provided around the hot gas off-take so the vessel may be tilted on trunions 3 and poured. The seals 8 should be as leak-proof as possible. Molten metal or slag may be drained through a bottom drain 9. The metal bath level may vary considerably and may be quite high, as shown, within the vessel.

As is known in the art, the impingement type lance is commonly of a concentric construction for the simultaneous introduction of two materials, and frequently is water-cooled in a known manner. Typically no attempt is made to cool a consumable lance such as pipe lance 26, which must be replaced almost continuously.

Figure 1:
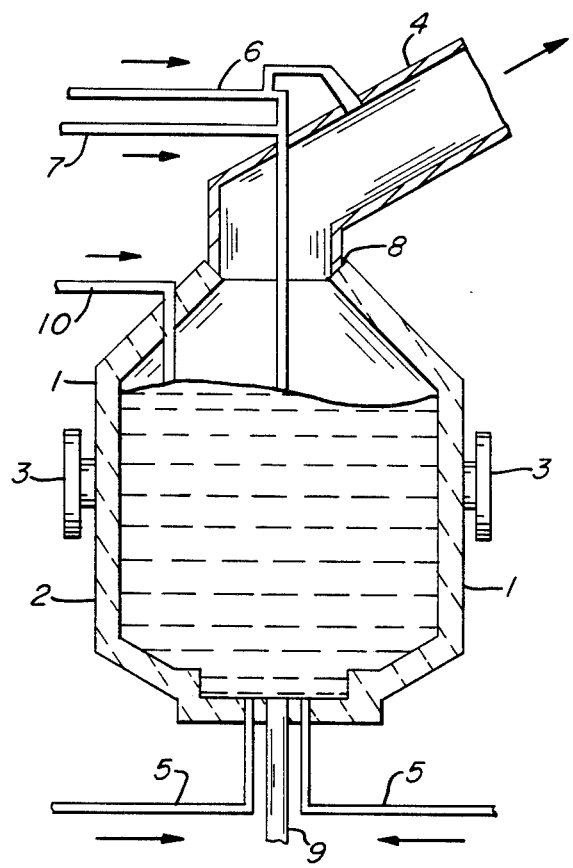

The reader may recognize that the unit of FIG. 1 is similar to a basic bottom-blown oxygen steelmaking vessel, except for the induction heating coils, and in fact such a vessel may be considered equivalent and fully operable in our invention. Due to the very high temperatures and extremes of chemical reactions taking place, refractory linings are recommended which are known to be resistant to erosion and degradation. At such temperatures, e.g. 2500° F. and above, as high as 4000° F., persons skilled in the art will recognize that virtually any organ waste or compound will be pyrolytically destroyed. That is, the heat energy alone will immediately induce bond rupture in the organic molecules, yielding molecular fragments, uncombined carbon atoms and other atoms from the organic compound structure, such as, in the case of PCBs, chlorine and hydrogen. Such highly excited carbon atoms are immediately amenable to oxidation, especially when they are in contact with the catalytic surface of the iron which serves also as a solvent for the carbon and which is ubiquitous in the thermally homogeneous, vigorously active bath. Any molecular fragments, i.e. activated carbonaceous species, not completely dissembled to their atomic constituents are equally susceptible to oxidation. The oxidation reaction is encouraged by the simultaneous topical and preferably conentric introduction of oxygen with the organic waste. The ratio of oxygen to the oxidizable components of the organic waste should be at least about 1:1. The concurrent introduction of oxygen (which may be in the form of air) and waste to be destroyed is conducted in the bath, impinging on the bath or in close proximity to the slag/metal interface, so as to provide an average residence time, which may be varied within the reaction zone, such as at least one-half ($\frac{1}{2}$) second and preferably an average of from one (1) to three (3) seconds, or of one and one-half ($1\frac{1}{2}$) seconds. By a reaction zone, we mean the zone within the furnace containing the molten metal and the space immediately above it and in contact with it. One of the advantageous features of our invention is the short residence time required—generally no more than two seconds within the bath and/or the reaction zone will be required to completely destroy pyrolytically, and oxidize, any organic compound. An average residence time of at least one and one-half second is the preferred objective, with a residence time distribution providing less than 5% of the carbon having a residence time of less than one-half second in the bath.

While the temperature of the bath should be at least high enough to maintain it in a molten state, including the slag, generally about 2500° F., the recommended temperature for complete and total destruction may be higher for some bath compositions. Generally as the molten metal content, especially the iron content, is reduced from 100% to 50% or lower, the catalytic activity of the bath, and the total carbon dissolved by the bath, are reduced, and a corresponding increase in temperature is recommeded in order to be certain of complete destruction. Persons skilled in the art may recognize also that the reactivity of the carbon of an organic molecule is also affected by the viscosity of the bath, which is also a function of its composition as well as the temperature. Good mixing and residence time distribution require that the viscosity of the molten metal fraction should be maintained at less than 10 centipoises.

The concentration of dissolved carbon should be maintained in the range of $\frac{1}{2}$% to 6% based on the molten iron, and preferably between about 2% and about 3%. At less than 2% carbon in the iron, the iron will start to oxidize in the presence of an FeO-solvent slag, even if oxygen introduction is maintained (which we recommend) at a level at least in stoichiometric relationship with the oxidizable portion of the organics introduced. Because of the potential damage to the refractory, iron oxidation, as evidenced by the presence of iron oxide in the slag, should be avoided in our invention.

Figure 2:
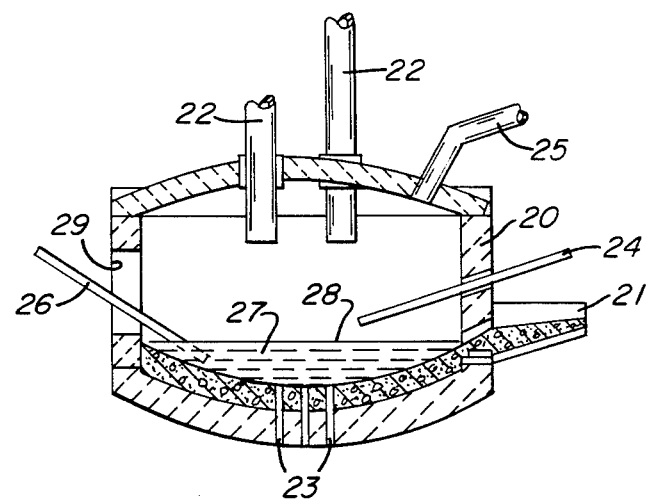
Referring now to FIG. 2, an electric arc furnace, tiltable in a known manner, is shown having walls 20 and a tapping spout 21, electrodes 22, bottom tuyeres 23 for injecting a mixture of oxygen and organic waste in the bath, lance injection means such as the impingement type pipe lance more or less diagrammatically shown at 24 for further injecting steam, oxygen, pulverized coal, and/or organic or inorganic wastes in the top of the furnace, and an offtake 25 for removing hot gases. Injection means 24 may be water-cooled in a known manner. Iron may be placed in the furnace through door 29. A consumable pipe lance 26 of a construction familiar to those skilled in the art may be used to inject waste below the surface of the molten iron 27 and slag 28.

The depth of the bath and the diameter of the nozzles for oxygen and organic introduction will affect the residence time; the depth of the bath will also affect the force required for injection of the oxygen and waste materials into it. Obviously the injection should be regulated so as to permit dispersion of the injected materials into the bath as soon as possible, and "blow-through" of the materials through excessive force is extremely undesirable if there is any likelihood that a portion of toxic materials will be emitted through the stack to the atmosphere without being destroyed. More than one injection point is useful for this purpose if only to minimize the volume of materal injected at any one point. Injectants, comprising organics, inorganics and oxygen sources, may be introduced in a known manner, such as submerged top lance, non-submerged top lance, non-submerged multi-directional port/sidewall nozzle, or bottom or sidewall tuyere(s), so as to provide introduction under the molten surface, above the molten surface, or impinging on the molten surface. For example, oxygen may be introduced by bottom or sidewall tuyeres, consumable lance or by impingement on the molten bath; solid carbonaceous materials may be introduced through bottom or sidewall tuyeres via inert carrier gas; solid inerts or inorganics, metallic or otherwise, may be introduced via non-reactive carrier gas through a top lance or multi-directional port nozzle; liquid and semi-liquid materials may be introduced above the bath or impinging on the bath by means of a top lance, multi-directional sidewall nozzle, or consumable port lance. Injections may also be made as illustrated in FIG. 2. The number and position of injection points is secondary to the principal objective of good mixing to assure the desired short residence time, pyrolytic destruction, and contact with the catalytic surface. The ratio of oxygen to organic material injected is ideally slightly more than stoichiometric with respect to the oxidizable portion of the organic material. Oxidizable portions of any other compounds injected with the organic compounds would of course enter into the calculations. Considerable excess oxygen, however, can be utilized since auxiliary fuels need not be involved.

The initial heating of the iron or iron-containing charge may be accomplished, as stated elsewhere herein, by the electrodes of an electric arc furnace, the induction coils of an induction furnace, or by any other suitable means such as a lance or source of flame or a hot charge from an external source. Once a molten state has been reached, i.e. typically at a minimum temperature of 2500° F., electrodes can be withdrawn, in the case of an electric arc furnace, and their respective ports of introduction capped in a known manner; injection may be initiated at any time and maintained throughout, irrespective of carbon level, other than saturation, and, externally applied heat sources may in most cases be suspended. When readily oxidizable waste is used, the exothermic reactions of the injected material will maintain the minimum temperature of 2500° F., and in fact under most circumstances and in most systems the temperature may be expected to rise. Minimum bath temperatures may, therefore, be maintained through short delays or intermittent operation by excess oxygen introduction provided sufficient levels of carbon exist within the bath. Under such circumstances oxygen is analogous to heat source introduction.

If the vessel employed is not well insulated and/or there is heat loss or other difficulty in maintaining the proper minimum temperature, or in maintaining the appropriate carbon concentration, additional carbonaceous material such as powdered coal may be injected, either directly into the bath or at a point immediately above it.

One means of controlling the temperature in addition to regulating the introduction of combustibles is to introduce such endothermic reactants as water and ferric chloride. Ferric chloride will add iron at the same time that it consumes energy, and therefore provides a convenint means for controlling the temperature of a bath which has a tendency to rise. Another possible means is to recycle the effluent gas into or above the molten bath. Those skilled in the art will recognize that this has multifold purposes: (1) it can enhance bath stability if recycle injection occurs beneath the surface, (2) it can serve to raise or lower bath temperature depending on where the effluent gas is removed from its reaction coordinate, and (3) it can serve to alter or maintain an effluent product distribution. Generally the temperature will rise when the molar ratio in the organic waste of hydrogen to carbon is high relative to the ratio of chlorine to carbon.

The gases produced may be recovered and/or processed in any of a number of known methods. For example, HCl may be recovered by absorbing the hydrogen chloride gas in dilute hydrochloric acid. Diluted carbon monoxide may be recovered as a fuel gas by employing a partial combustion gas cleaning system or it may be recovered for other purposes such as the production of $C_1$ (chemistry) based hydrocarbons, for example methanol, which can be formed by reacting carbon monoxide, which may be recovered pure by known absorption or permeable membrane techniques, with hydrogen in catalytic reactors. Elemental chlorine may be obtained by catalytic or electrolytic methods. Carbon dioxide may be further generated in a full combustion gas cleaning system, and it may be separated by standard gas processing techniques, for example liquid absorption.

We claim:

1. Method of pyrolytically and oxidatively destroying organic waste comprising (1) providing a molten bath of at least 10% iron in a furnace, (2) maintaining the molten metal fraction of said bath at a viscosity no greater than 10 centipoise, and (3) continuously and conjointly injecting oxygen and said organic waste in a stoichiometric ratio of oxygen to the oxidizable portion of said organic waste of at least 1:1 into or onto said bath to maintain an average residence time of said waste in said furnace of at least about one-half second.

2. Method of claim 1 wherein the organic waste comprises polychlorinated biphenyls.

3. Method of claim 1 including also the step of introducing into said bath materials which are endothermically reactive under the conditions of the bath to moderate the tendency of the temperature of the bath to increase.

4. Method of claim 1 wherein the organic waste comprises pesticides or herbicides.

5. Method of claim 1 wherein the organic waste comprises halogen-containing and non-halogen-containing synthetic compounds and solvents.

6. Method of claim 1 wherein the waste is injected from the side of said bath.

7. Method of claim 1 wherein oxidizable materials including wastes are introduced above the bath such that materials impinge on the surface or react in the gas phase above the surface.

8. Method of claim 1 wherein at least a portion of the effluent gas is partially recycled to a point immediately above the bath to alter or maintain product distribution.

9. Method of claim 1 wherein the effluent gas is partially recycled to the bath.

10. Method of claim 1 wherein the organic waste and oxygen are introduced into said bath at a rate to maintain the concentration of dissolved carbon in the molten iron at about ½% to about 6%.

11. Method of claim 4 wherein carbonaceous materials other than waste are also injected and both the waste and the other carbonaceous materials are used to maintain said dissolved carbon concentration.

12. Method of pyrolytically and oxidatively destroying organic waste containing significant amounts of chemically bound halogens comprising injecting said waste into a reaction zone comprising a molten bath of at least 10% iron at a temperature of at least about 2500° F., said reaction zone contained in a reactor, the molten metal fraction of said bath having a viscosity no greater than 10 centipoise, and conjointly injecting oxygen in a stoichiometric relationship to the oxidizable portion of said waste to maintain an average residence time of said waste in said reactor of at least about one-half second, collecting gases evolving from said bath, and recovering hydrogen halide therefrom.

13. Method of claim 12 wherein the waste has a residence time in the reaction zone of about 1–3 seconds.

14. Method of claim 12 wherein the temperature of the bath, is regulated by the controlled addition of ferric chloride to the bath.

15. Method of claim 12 wherein the HCl is recovered by absorption in dilute hydrochloric acid.

16. Method of claim 12 wherein the waste is injected from the side of said bath.

17. Method of claim 8 wherein oxidizable materials including wastes are introduced above the bath such that materials impinge on the surface or react in the gas phase above the surface.

18. Method of claim 12 wherein the injection of waste and oxygen is regulated to maintain continuously a concentration of carbon in the bath of about 2–3% based on the iron.

19. Method of claim 18 wherein carbonaceous materials other than waste are also injected and both the waste and the other carbonaceous materials are used to maintain the concentration of carbon in said bath.

* * * * *